United States Patent
Bang et al.

(10) Patent No.: US 7,978,910 B2
(45) Date of Patent: Jul. 12, 2011

(54) METHOD AND APPARATUS FOR ADAPTIVELY FILTERING INPUT IMAGE IN COLOR DOMAINS

(75) Inventors: Yousun Bang, Seoul (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 946 days.

(21) Appl. No.: 11/580,901

(22) Filed: Oct. 16, 2006

(65) Prior Publication Data

US 2007/0085857 A1    Apr. 19, 2007

(30) Foreign Application Priority Data

Oct. 14, 2005   (KR) .................. 10-2005-0097153

(51) Int. Cl.
G06K 9/34  (2006.01)
G06K 9/40  (2006.01)
(52) U.S. Cl. ......................... 382/164; 382/261
(58) Field of Classification Search .................. None
See application file for complete search history.

(56) References Cited

U.S. PATENT DOCUMENTS

| | | | | |
|---|---|---|---|---|
| 5,253,302 A * | 10/1993 | Massen | .................. | 382/110 |
| 5,363,209 A | 11/1994 | Eschbach et al. | | |
| 5,497,249 A | 3/1996 | Koizumi et al. | | |
| 5,778,156 A * | 7/1998 | Schweid et al. | .................. | 706/52 |
| 6,317,516 B1 * | 11/2001 | Thomsen et al. | ............. | 382/224 |
| 6,721,457 B1 | 4/2004 | Atkins et al. | | |
| 6,978,042 B1 * | 12/2005 | Shin et al. | .................. | 382/164 |
| 7,227,988 B2 * | 6/2007 | Curry et al. | .................. | 382/166 |
| 7,336,818 B2 * | 2/2008 | Kondo et al. | .................. | 382/164 |
| 7,400,761 B2 * | 7/2008 | Ma et al. | .................. | 382/162 |
| 7,747,071 B2 * | 6/2010 | Yen et al. | .................. | 382/165 |
| 2003/0026495 A1 | 2/2003 | Gondek et al. | | |
| 2006/0033936 A1 * | 2/2006 | Lee et al. | .................. | 358/1.2 |

FOREIGN PATENT DOCUMENTS

| | | |
|---|---|---|
| EP | 1473669 A2 * | 11/2004 |
| JP | 2004-336743 A | 11/2004 |
| KR | 1020020080574 | 10/2002 |

* cited by examiner

*Primary Examiner* — Vikkram Bali
*Assistant Examiner* — Michelle Entezari
(74) *Attorney, Agent, or Firm* — Sughrue Mion, PLLC

(57) ABSTRACT

A method and apparatus for adaptively filtering an input image are provided. The method includes dividing an input image into a plurality of color domains according to a distribution of colors in the input image, respectively calculating a plurality of filter coefficients for the color domains, and adaptively filtering the color domains using the respective filter coefficients. The apparatus includes a domain classification unit which divides an input image into a plurality of color domains according to a distribution of colors in the input image, a filter coefficient calculation unit which respectively calculates a plurality of filter coefficients for the color domains, and a filtering unit which respectively filters the color domains using the filter coefficients. Accordingly, it is possible to enhance picture quality by addressing the problem of limited texture representation capabilities of existing filtering methods and apparatuses especially for memory color domains.

12 Claims, 6 Drawing Sheets

SKY BLUE DOMAIN (502)

SKIN TONE DOMAIN (501)

NON-MEMORY COLOR DOMAIN (500)

GREEN GRASS DOMAIN (503)

METHOD AND APPARATUS FOR ADAPTIVELY FILTERING INPUT IMAGE IN COLOR DOMAINS

CROSS-REFERENCE TO RELATED APPLICATION

This application claims priority from Korean Patent Application No. 10-2005-0097153 filed on Oct. 14, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to adaptively filtering an input image in color domain units in which the input image is divided into a plurality of color domains, a plurality of filter coefficients are respectively calculated for the color domains, and the input image is adaptively filtered in units of the color domains according to the properties of the color domains.

2. Description of the Related Art

In order to meet various user demands, the functions of digital imaging devices such as monitors, scanners, and printers have diversified and improved. Digital imaging devices may adopt different color spaces or color models according to their purpose of use. Color models are classified into device-dependent color models and device-independent color models. Examples of the device-dependent color models include red-green-blue (RGB) models and cyan-magenta-yellow-black (CMYK) color models which are a type of subtraction color space models. Examples of the device-independent color models include CIE color models such as a CIEL*a*b* model, a CIE XYZ model, and a CIE LUV model. In the meantime, CMYK color spaces are widely used in the field of printing, whereas RGB color space are widely used in the field of computer graphics based on computer monitors, e.g., the field of web graphics.

Some colors in digital images printed by printers or displayed by display devices can be easily registered in a person's memory and can be remembered for a long time, and these colors are referred to as memory colors. Memory colors are colors of objects which are familiar to most people, and thus, most people automatically perceive these colors as they are without even looking at the objects. The performance of printers or display devices is affected by how properly the printers or display devices can represent memory colors. Therefore, a variety of filtering techniques capable of enhancing the sharpness of digital images containing memory colors while reducing noise have been developed.

U.S. Pat. No. 6,721,457 discloses a threshold-based adaptive filtering method in which luminance of a pixel window of an input image is determined, the result of the determination is compared with a predefined threshold, and an appropriate adaptive filter is chosen for the input image according to the results of the comparison. In this threshold-based adaptive filtering method, however, only luminance is taken into consideration when determining a filter coefficient, and thus, the filter coefficient may not properly reflect the properties of colors of the input image. Also, this threshold-based adaptive filtering method is not suitable for representing natural colors such as skin tones, sea blue, and green grass, which have different color properties from one another.

U.S. Pat. No. 5,363,209 discloses a sharpness adjustment procedure in which an input image signal is converted into a plurality of luminance-chrominance signals, the sharpness of the input image is determined based on the luminance-chrominance signals, and a filter coefficient for the input image is calculated using a filter function. This sharpness enhancement method can generally enhance the sharpness of images, but is likely to increase graininess and noise when applied to skin tone domains of images.

There are a considerable number of related art image quality enhancement techniques other than those set forth herein. However, none of the related art image quality enhancement techniques can adaptively generate a filter coefficient according to the properties of memory colors such as skin tones, sky blue, green grass, and sea blue.

SUMMARY OF THE INVENTION

A method and apparatus are provided for adaptively filtering an input image in color domain units which can address the problem of limited texture representation capabilities of existing filtering methods and apparatuses especially for memory color domains; and can selectively render a plurality of memory color domains in an input image smoothly or sharply by adaptively using filters according to the properties of the memory color domains.

However, the aspects of the present invention are not restricted to the one set forth herein. The above and other aspects of the present invention will become more apparent to one of ordinary skill in the art to which the aspects of the present invention pertain by referencing a detailed description of the present invention given below.

According to an aspect of the present invention, there is provided a method of adaptively filtering an input image in color domain units. The method includes dividing an input image into a plurality of color domains according to a distribution of colors in the input image, respectively calculating a plurality of filter coefficients for the color domains, and adaptively filtering the color domains using the respective filter coefficients.

According to another aspect of the present invention, there is provided an apparatus for adaptively filtering an input image in color domain units. The apparatus includes a domain classification unit which divides an input image into a plurality of color domains according to a distribution of colors in the input image, a filter coefficient calculation unit which respectively calculates a plurality of filter coefficients for the color domains, and a filtering unit which respectively filters the color domains using the filter coefficients.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus redundant descriptions will be omitted.

A method and apparatus for adaptively filtering an input image in color domain units according to exemplary embodiments of the present invention will now be described in detail with reference to the accompanying block diagrams and flowcharts.

Figure 1:
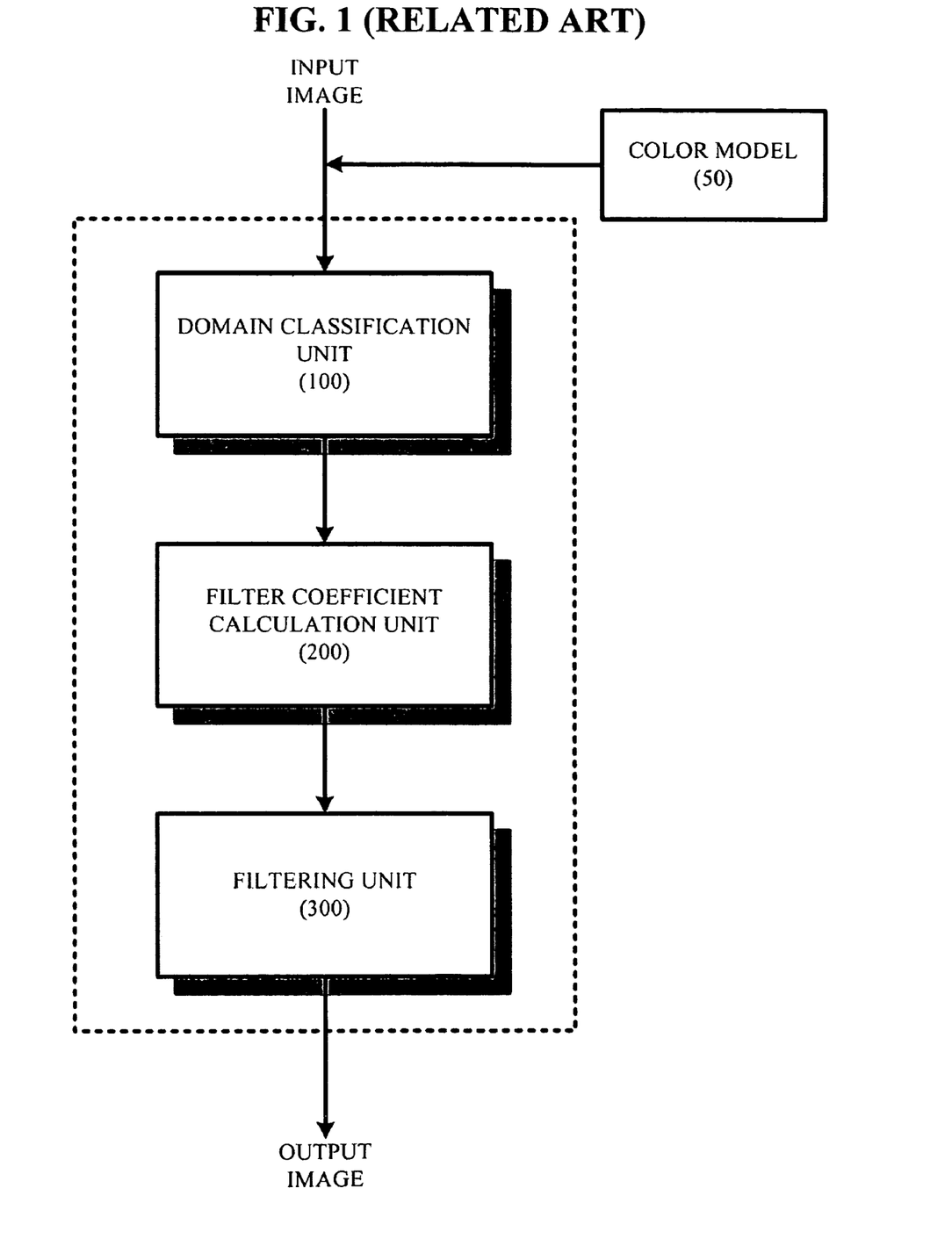
FIG. 1 is a block diagram of an apparatus for adaptively filtering an input image in color domain units according to an exemplary embodiment of the present invention.

FIG. 1 is a block diagram of an apparatus for adaptively filtering an input image in color domain units according to an exemplary embodiment of the present invention. Referring to FIG. 1, the apparatus includes a domain classification unit 100, a filter coefficient calculation unit 200, and a filtering unit 300.

The domain classification unit 100 receives an input digital image and divides the input digital image into a plurality of color domains according to the pattern of distribution of colors in the digital image. The color domains are classified into memory color domains such as a skin tone domain, a sky blue domain, a green grass domain, and a sea blue domain, and non-memory color domains. Memory colors are colors of objects which are familiar to most people and affect the quality of images. Examples of the memory colors include a variety of natural colors such as skin tones, sky blue, green grass, and sea blue. The domain classification unit 100 may respectively allocate pixel class values of 1, 2, 3, 4, and 0 to a skin tone domain, a sky blue domain, a green grass domain, a sea blue domain, and a non-memory color domain and classify the color domains of the input digital image as being memory color domains or non-memory color domains according to the pixel class values of the color domains of the input digital image.

The filter coefficient calculation unit 200 respectively calculates a plurality of filter coefficients for the color domains of the input digital image. The structure and operation of the filter coefficient calculation unit 200 will hereinafter be described in further detail with reference to FIG. 2.

Figure 2:
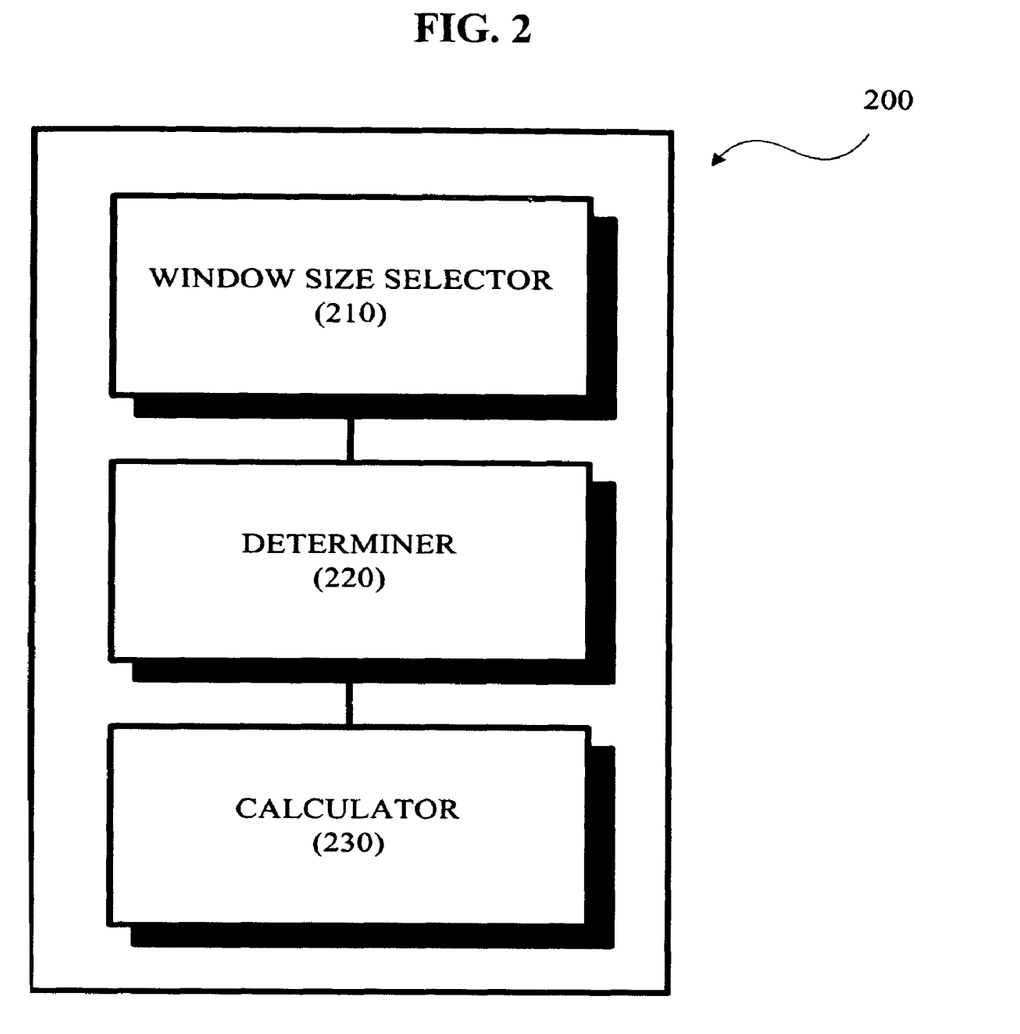
FIG. 2 is a block diagram of a filter coefficient calculation unit illustrated in FIG. 1.

FIG. 2 is a block diagram of the filter coefficient calculation unit 200 illustrated in FIG. 1. Referring to FIG. 2, the filter coefficient calculation unit 200 includes a window size selector 210, a determiner 220, and a calculator 230.

The window size selector 210 determines a window size for a filter according to the filtering speed and precision of the filter.

The determiner 220 determines whether a pixel window with the determined widow size comprises a plurality of color domains having different pixel class values. The calculator 230 may generate a variety of filter coefficients according to the results of the determination performed by the determiner 220. In detail, if the determiner 220 determines that the pixel window with the determined widow size comprises at least one color domain having the same pixel class value, i.e., a pixel class value of 1 or 2, then the calculator 230 generates a smoothing filter coefficient so that the color domains included in the pixel window with the determined widow size can be smoothly rendered. If the determiner 220 determines that the pixel window with the determined widow size comprises at least one color domain having the same pixel class value, i.e., a pixel class value of 3 or 4, then the calculator 230 generates a sharpening filter coefficient so that the color domains included in the pixel window with the determined widow size can be sharply rendered. If the determiner 220 determines that the pixel window with the determined widow size comprises at least one color domain having the same pixel class value, i.e., a pixel class value of 0, then the calculator 230 does not generate any filter coefficient. If the determiner 220 determines that the pixel window with the determined widow size comprises a plurality of color domains having different pixel class values, then the calculator 206 determines the pattern of distribution of the different pixel class values in the pixel window with the determined window size, and generates an attenuating filter coefficient according to the determined pixel class value distribution pattern.

The filtering unit 300 performs an adaptive filtering operation on each of the color domains of the input digital image using the filter coefficient generated by the filtering coefficient calculation unit 200 by referencing the results of the classification performed by the domain classification unit 100.

In this disclosure, the terms "unit," "module," and "table" refer to a software program or a hardware device (such as a Field Programmable Gate Array (FPGA) or an Application Specific Integrated Circuit (ASIC)) which performs a predetermined function. However, the present invention is not restricted to these implementations. In particular, modules may be implemented in a storage medium which can be addressed or may be configured to execute at least one processor. Examples of such modules include software components, object-oriented software components, class components, task components, processes, functions, attributes, procedures, sub-routines, program code segments, drivers, firmware, microcode, circuits, data, databases, data architecture, tables, arrays, and variables. The functions provided by components or modules may be integrated with one another so that they can be executed by a smaller number of components or modules or may be divided into smaller functions so that they need additional components or modules. Also, components or modules may be realized to drive one ore more CPUs in a device.

Figure 3:
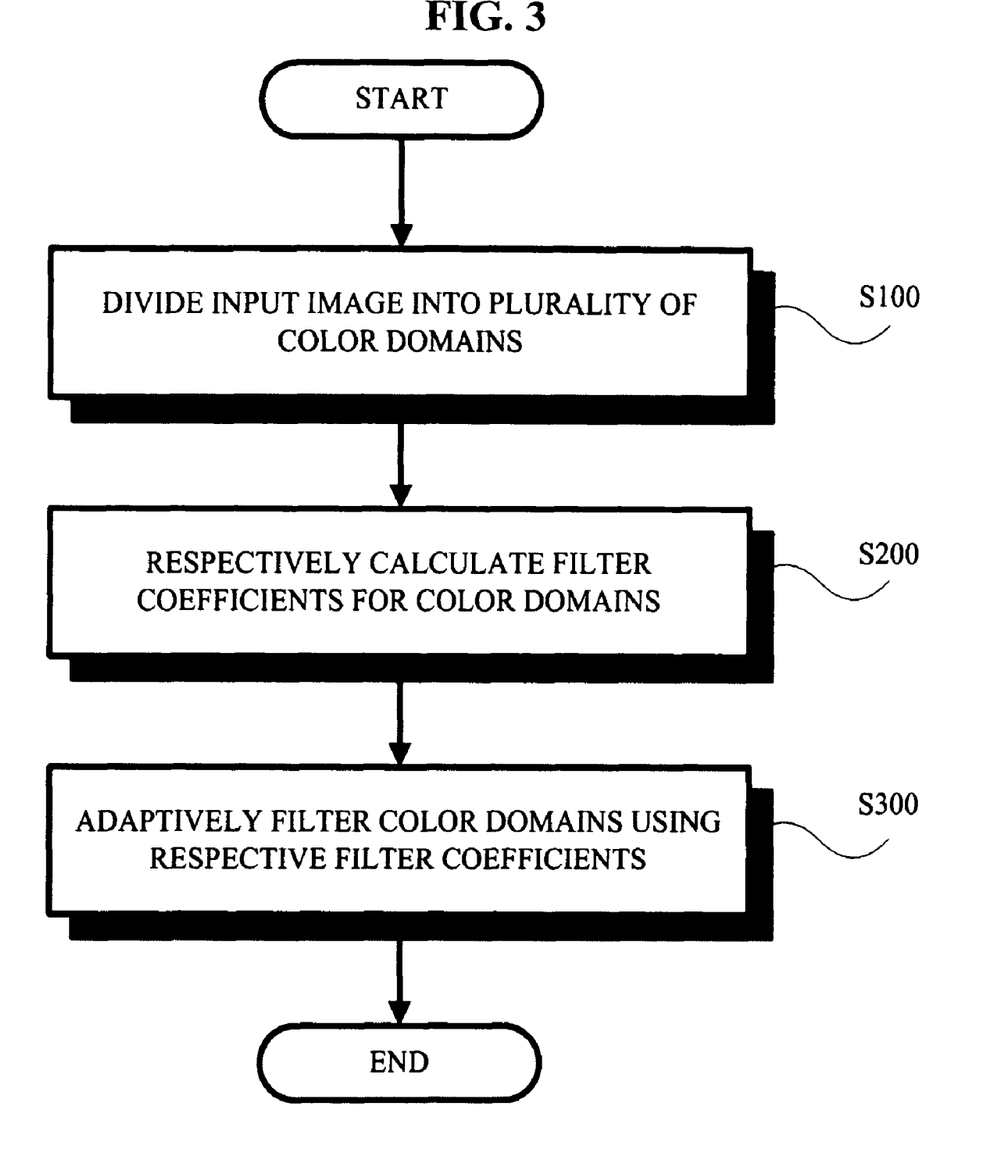
FIG. 3 is a flowchart illustrating a method of adaptively filtering an input image in color domain units according to an exemplary embodiment of the present invention.
Figure 5A:
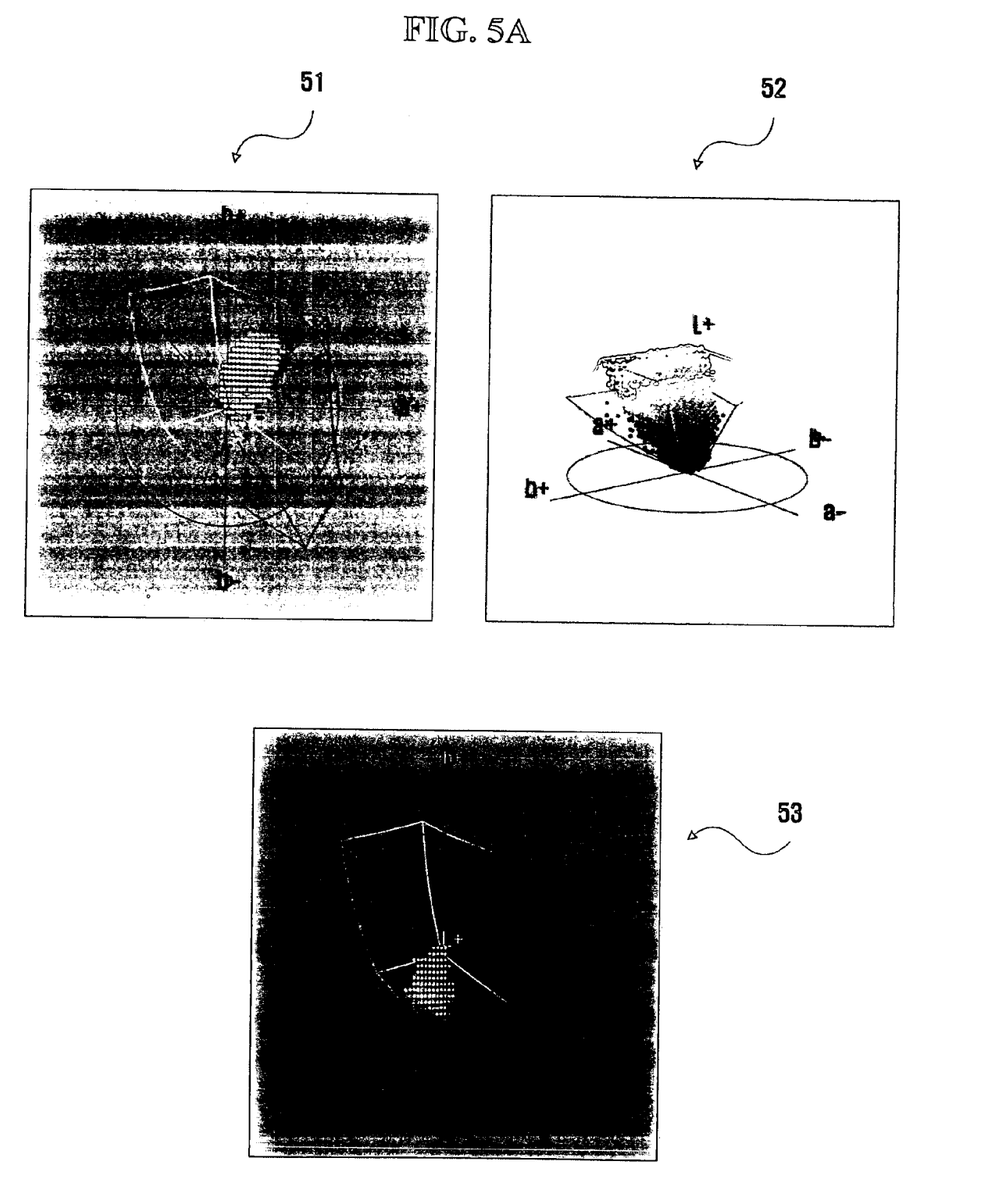
FIG. 5A illustrates a plurality of memory color models defined in a CIE L*a*b* color space according to an exemplary embodiment of the present invention.

FIG. 3 is a flowchart of a method of adaptively filtering an input image in color domain units according to an exemplary embodiment of the present invention. Referring to FIG. 3, in operation S100, the domain classification unit 100 classifies a plurality of color domains into which an input image is divided according to the pattern of distribution of colors in the input image. The domain classification unit 100 may classify the color domains of the input image into memory color domains such as a skin tone domain, a sky blue domain, a green grass domain, and a sea blue domain, and non-memory color domains according to a predefined color model 50 in consideration that the smoothing or sharpening of the texture of the memory color domains is crucial to improve the quality of the input image. The color model 50 defines each of a plurality of memory color domains according to a predetermined color space. For example, the color model 50 may define the hue (h) of a skin tone domain according to an HSV color space as satisfying the following inequality: $2.3° < h < 38.1°$; and define the saturation of the skin tone domain using the HSV color space as satisfying the following inequality: 0.29<s<0.65. The color model 50 may also define each of the memory color domains according to a CIE L*a*b* color space, as illustrated in FIG. 5A. FIG. 5A illustrates three memory color models 51, 52, and 53 established using a CIE L*a*b* color space according to an exemplary embodiment of the present invention. CIE color models are color models developed by the International Commission on Illumination (ICI) which is an organization for establishing a set of standards regarding illumination devices. Referring to FIG. 5A, the memory color model 51 defines a skin tone domain according to an L*a*b color space, the memory color model 52 defines a green grass domain according to the L*a*b* color space, and the memory color model 53 defines a sky blue domain according to the L*a*b* color space.

Figure 5B:
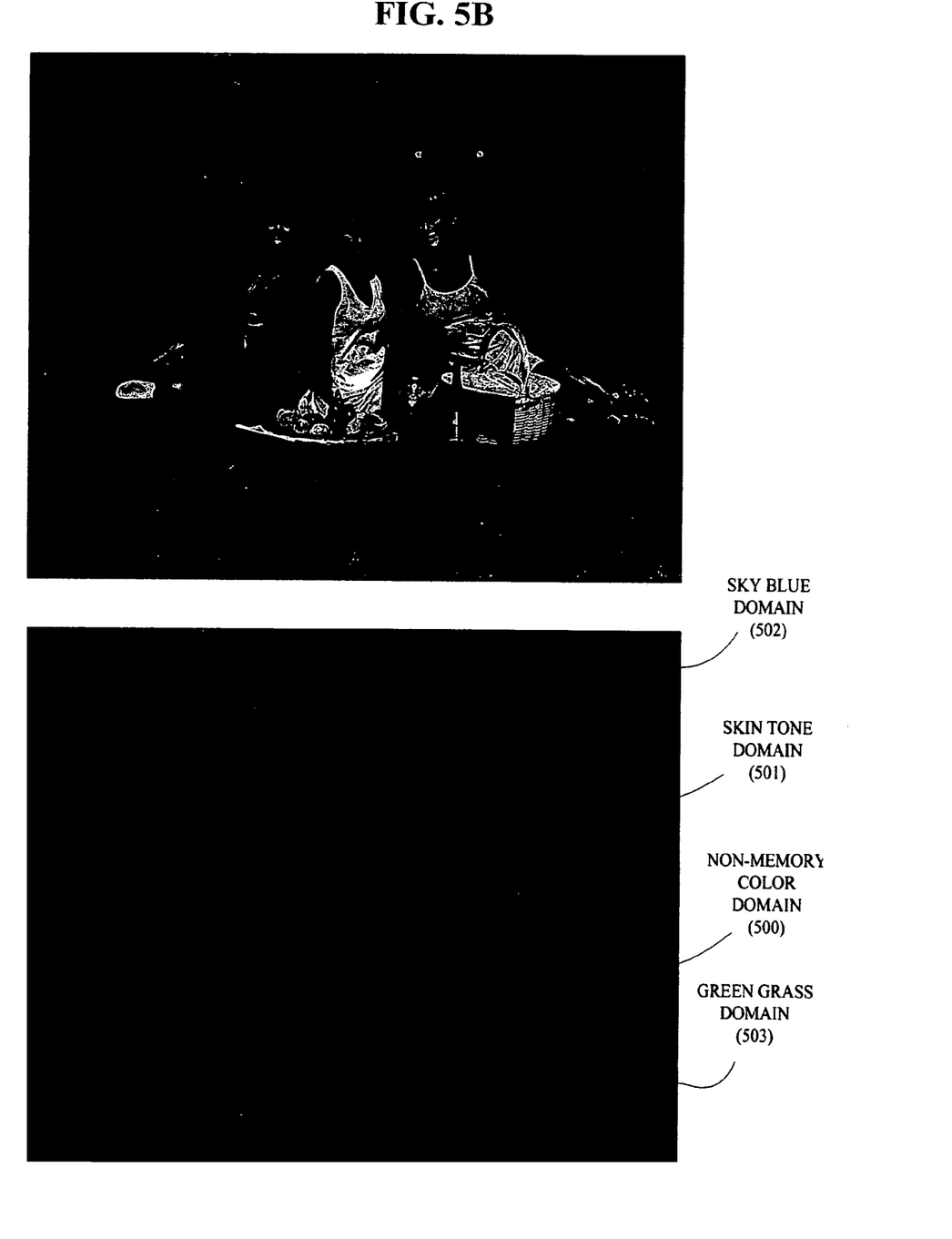
FIG. 5B illustrates an input image and a plurality of color domains into which the input image is divided according to an exemplary embodiment of the present invention.

The color domains of the input image are classified into memory color domains and non-memory color domains according to the properties of a plurality of default memory color domains defined in the aforementioned manner, and the color domains classified as being memory color domains are extracted from the input image in consideration of their locations in the input image. This process will hereinafter be described in further detail with reference to FIG. 5B. FIG. 5B presents an input image and a plurality of color domains into which the input image is divided according to an exemplary embodiment of the present invention. Referring to the input image illustrated on the upper side of FIG. 5B, an upper portion of the input image corresponds to a sky blue domain 502, portions of the input image rendering the faces and bare limbs of three women correspond to a skin tone domain 501, and lower and leftward portions of the input image correspond to a green grass domain 503. The domain classification unit 100 may create a weighting map illustrated on the lower side of FIG. 5B by respectively allocating a plurality of pixel class values to the skin tone domain 501, the sky blue domain 502, the green grass domain 503, and a non-memory color domain 500 of the input image illustrated on the upper side of FIG. 5B.

In detail, referring to the weighting map illustrated on the lower side of FIG. 5B, a plurality of pixels included in the skin tone domain 501 are all set to a pixel class value of 1, a plurality of pixels included in the sky blue domain 502 are all set to a pixel class value of 2, and a plurality of pixels included in the green grass domain 503 are all set to a pixel class value of 3. Portions of the input image rendering the clothes worn by the three women and a mat spread on the grass do not correspond to a memory color domain, and are thus classified into the non-memory color domain 500. Then a plurality of pixels included in the non-memory color domain 500 are all set to a pixel class value of 0. The input image illustrated on the upper side of FIG. 5B does not include a sky blue domain.

Referring to FIG. 3, in operation S200, the filter coefficient calculation unit 200 calculates a filter coefficient for each of the color domains of the input image according to the results of the classification performed in operation S100. Operation S200 will hereinafter be described in further detail with reference to FIG. 4.

Figure 4:
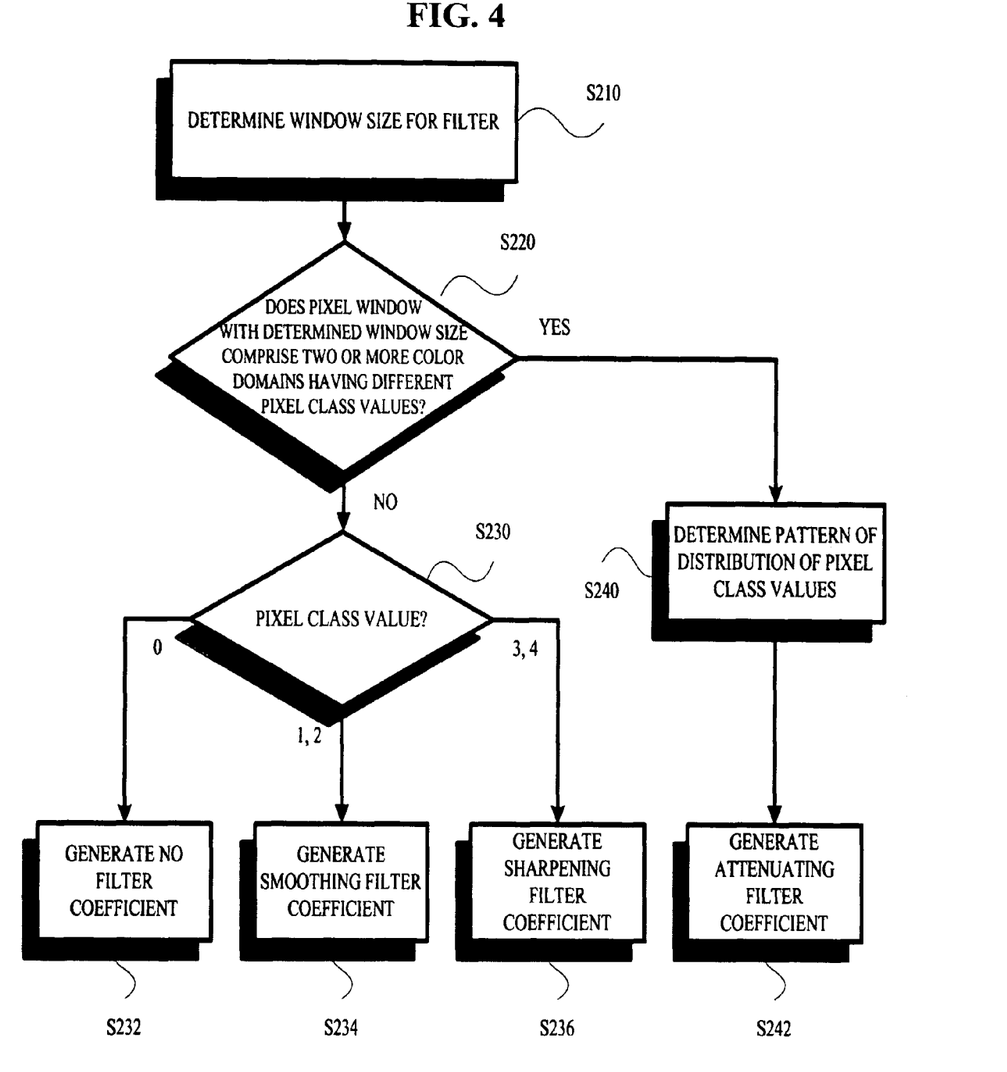
FIG. 4 is a flowchart illustrating the calculation of a filter coefficient, i.e., operation S200 illustrated in FIG. 3.

FIG. 4 is a flowchart illustrating the calculation of a filter coefficient, i.e., operation S200 illustrated in FIG. 3. Referring to FIG. 4, in operation S210, the window size selector 210 determines a window size for a filter according to the filtering speed and precision of the filter. The determined window size may be 3×3, 5×5, 9×9, or 25×25. The greater the determined window size is, the lower the filtering speed of the filter becomes and the higher the filtering precision of the filter becomes. On the other hand, the smaller the determined window size is, the less the number of computations is required. Thus, the smaller the determined window size is, the higher the filtering speed of the filter becomes and the lower the filtering precision of the filter becomes.

In operation S220, the determiner 220 determines whether the pixel window with the determined widow size comprises a plurality of color domains having different pixel class values, i.e., whether the pixel window with the determined widow size comprises the boundaries of a plurality of color domains which adjoin each other and have different pixel class values.

The calculator 230 may generate a variety of filter coefficients according to the results of the determination performed by the determiner 220. In detail, in operation S230, if it is determined in operation S220 that the pixel window with the determined widow size comprises at least one color domain having the same pixel class value, the calculator 230 determines the pixel class value of the color domains included in the pixel window with the determined widow size. In operation S234, if it is determined in operation S230 that the pixel class value of the color domains included in the pixel window with the determined widow size is 1 or 2, i.e., if the results of the determination performed in operation S230 indicate that the color domains included in the pixel window with the determined widow size are skin tone domains or blue sky domains, then the calculator 230 determines that the corresponding color domains need to be smoothly rendered and thus generates a smoothing filter coefficient to realize a low pass filter. Sky blue domains and skin tone domains are defined in a color space as different domains. Therefore, the smoothing filter coefficient generated in operation S234 must be appropriately adjusted according to whether the color domains are sky blue domains or skin tone domains. The degree to which the picture quality of the color domains included in the pixel window with the determined widow size is to be smoothed can be adjusted by controlling parameters of a smoothing filter to conform to those of a Gaussian filter or a Butterworth low pass filter. Especially when the color domains included in the pixel window with the determined widow size are sky blue domains, the corresponding color domains may be filtered by applying a weight value to a blue domain in an RGB color space.

In operation S236, if it is determined in operation S230 that the pixel class value of the color domains included in the pixel window with the determined widow size is 3 or 4, i.e., if the results of the determination performed in operation S230 indicate that the color domains included in the pixel window with the determined widow size are green grass domains or sea blue domains, then the calculator 230 determines that the corresponding color domains need to be sharply rendered and thus generates a sharpening filter coefficient. The sharpening filter coefficient may be generated using a fifth-order Butterworth high pass filter. Then the color domains included in the pixel window with the determined widow size are appropriately filtered according to the color properties of green grass domains or sea blue domains.

In operation S232, if it is determined in operation S230 that the pixel class value of the color domains included in the pixel window with the determined widow size is 0, i.e., if the results of the determination performed in operation S230 indicate that the color domains included in the pixel window with the determined widow size are non-memory color domains, then the calculator 230 does not generate any filter coefficient and outputs the input image as it is so that the values of input pixels are equal to the vales of output pixels.

In operation S240, if it is determined in operation S220 that the pixel window with the determined widow size comprises a plurality of color domains having different pixel class values, then the calculator 230 determines the pattern of distribution of the different pixel class values in the pixel window with the determined widow size by, for example, averaging the different pixel class values, determining the dispersion of the different pixel class values, or using the difference between a maximum and a minimum of the different pixel class values. In operation S242, the calculator 230 generates an attenuating filter coefficient by considering the properties of all pixel classes include in the pixel window with the determined widow size according to the determined pixel class value distribution pattern generated in operation S240. For example, if the pixel window with the determined widow size comprises a skin tone domain and a sea blue domain, the skin tone domain and the sea blue domain may be filtered using a smoothing filter and a sharpening filter, respectively, to apply different weights to the skin tone domain and the sea blue domain so that the skin tone domain can be smoothly rendered and the sea blue domain can be sharply rendered.

One of ordinary skill in the art to which the present invention pertains would recognize that a method and apparatus for adaptively filtering an input image in color domain units and a computer-readable recording medium storing a computer program for executing the method of adaptively filtering an input image in color domain units are all within the scope of the present invention.

According to the present invention, it is possible to more properly render the texture of memory color domains in an input image than in the related art by adaptively using filters according to the properties of a plurality of color domains in the input image.

In addition, according to the present invention, it is possible to smoothly render skin toned/sky blue portions of an input image by adaptively applying filter coefficients while reducing noise, and it is possible to sharply render sea blue and green grass portions of the input images by adaptively applying filter coefficients.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of adaptively filtering an input image in color domain units, the method comprising:
   dividing an input image into a plurality of color domains according to a distribution of colors in the input image, different pixel class values being respectively allocated to the plurality, of color domains;
   respectively calculating a plurality of filter coefficients for the color domains; and
   adaptively filtering the color domains using the respective filter coefficients,
   wherein the respectively calculating comprises:
   (a) choosing a window size for a predetermined filter;
   (b) determining whether a pixel window with the window size comprises a plurality of color domains each of which has a different pixel class value; and
   (c) if the determining in (b) determines that the pixel window with the window size comprises the plurality of color domains each of which has a different pixel class value, determining a pattern of distribution of the color domains within the pixel window, and producing an attenuating filter coefficient according to the pattern of distribution.

2. The method of claim 1, further comprising classifying the color domains into memory color domains and non-memory color domains, wherein the memory color domains comprise a skin tone domain, a sky blue domain, a green grass domain, and a sea blue domain which can be respectively defined by a plurality of color domains established according to a predetermined color space.

3. The method of claim 2, wherein the dividing comprises respectively setting the skin tone domain, the sky blue domain, the green grass domain, the sea blue domain, and the non-memory color domains to pixel class values of 1, 2, 3, 4, and 0 and classifying the color domains according to the setting.

4. The method of claim 3, wherein (c) comprises, if the determining in (b) determines that the pixel window with the window size comprises at least one color domain having the same pixel class value, producing a smoothing filter coefficient to smooth the picture quality of the color domains included in the pixel window with the window size if the color domains included in the pixel window with the window size has a pixel class value of 1 or 2; producing a sharpening filter coefficient to sharpen the picture quality of the color domains included in the pixel window with the window size if the color domains included in the pixel window with the window size has a pixel class value of 3 or 4; and producing no filter coefficient if the color domains included in the pixel window with the window size has a pixel class value of 0.

5. A non-transitory computer-readable recording medium storing a computer program for executing the method of claim 1.

6. A non-transitory computer-readable recording medium storing a computer program for executing the method of claim 2.

7. A non-transitory computer-readable recording medium storing a computer program for executing the method of claim 3.

8. A non-transitory computer-readable recording medium storing a computer program for executing the method of claim 4.

9. An apparatus for adaptively filtering an input image in color domain units, the apparatus comprising:
   a domain classification unit which divides an input image into a plurality of color domains according to a distribution of colors in the input image, different pixel class values being respectively allocated to the plurality of color domains;
   a filter coefficient calculation unit which respectively calculates a plurality of filter coefficients for the color domains; and
   a filtering unit which respectively filters the color domains using the filter coefficients,
   wherein the filter coefficient calculation unit comprises:
   a window size selector which chooses a window size for a predetermined filter;
   a determiner which determines whether a pixel window with the window size comprises a plurality of color domains each of which has a different pixel class value; and
   a calculator which generates a variety of filter coefficients according to the determination of the determiner;
   wherein, if the determination by the determiner indicates that the pixel window with the window size comprises the plurality of color domains each of which has s a different pixel class value, the calculator determines a pattern of distribution of the color domains within the pixel window, and generate an attenuating filter coefficient according to the pattern of distribution.

10. The apparatus of claim 9, wherein the domain classification unit classifies the color domains into memory color domains and non-memory color domains, and the memory color domains comprise a skin tone domain, a sky blue domain, a green grass domain, and a sea blue domain which can be respectively defined by a plurality of color domains established according to a predetermined color space.

11. The apparatus of claim 10, wherein the domain classification unit respectively sets the skin tone domain, the sky blue domain, the green grass domain, the sea blue domain, and the non-memory color domains to pixel class values of 1, 2, 3, 4, and 0 and classifies the color domains into which the input image is divided according to the setting.

12. The apparatus of claim 11, wherein, if the determination of the determiner indicates that the pixel window with the window size comprises at least one color domain having the same pixel class value, the calculator generates a smoothing filter coefficient to smooth the picture quality of the color domains included in the pixel window with the window size if the color domains included in the pixel window with the window size has a pixel class value of 1 or 2; generates a sharpening filter coefficient to sharpen the picture quality of the color domains included in the pixel window with the window size if the color domains included in the pixel window with the window size has a pixel class value of 3 or 4; and generates no filter coefficient if the color domains included in the pixel window with the window size has a pixel class value of 0.

* * * * *